United States Patent
Hu et al.

(10) Patent No.: US 10,937,193 B2
(45) Date of Patent: Mar. 2, 2021

(54) MULTI-SENSOR ALIGNMENT AND REAL TIME DISTORTION CORRECTION AND IMAGE REGISTRATION

(71) Applicant: Goodrich Corporation, Charlotte, NC (US)

(72) Inventors: Haijun Hu, Charlotte, NC (US); Andrew Eckhardt, Richboro, PA (US)

(73) Assignee: Goodrich Corporation, Charlotte, NC (US)

( * ) Notice: Subject to any disclaimer, the term of this patent is extended or adjusted under 35 U.S.C. 154(b) by 86 days.

(21) Appl. No.: 16/210,918

(22) Filed: Dec. 5, 2018

(65) Prior Publication Data
US 2020/0184683 A1   Jun. 11, 2020

(51) Int. Cl.
| | |
|---|---|
| G06T 7/80 | (2017.01) |
| G06T 7/33 | (2017.01) |
| G06T 7/00 | (2017.01) |
| H04N 5/232 | (2006.01) |
| H04N 5/33 | (2006.01) |

(52) U.S. Cl.
CPC ............ G06T 7/80 (2017.01); G06T 7/001 (2013.01); G06T 7/337 (2017.01); H04N 5/23212 (2013.01); H04N 5/332 (2013.01); G06T 2207/10036 (2013.01)

(58) Field of Classification Search
CPC .......... G06F 17/18; G06T 2207/10024; G06T 2207/30208; G06T 2207/30244; G06T 7/13; G06T 7/70; G06T 7/80; G06T 7/85; H04N 13/246
See application file for complete search history.

(56) References Cited

U.S. PATENT DOCUMENTS

| | | |
|---|---|---|
| 4,825,394 A | 4/1989 | Beamish et al. |
| 5,095,447 A | 3/1992 | Manns et al. |

(Continued)

FOREIGN PATENT DOCUMENTS

| | | |
|---|---|---|
| CN | 104966063 A | 10/2015 |
| CN | 104067334 B | 10/2016 |

(Continued)

OTHER PUBLICATIONS

Hoff et al., "Compensating for Centroid Errors Due to Surface Tilt and Lens Distortion," Martin Marietta Astronautics Group.

(Continued)

*Primary Examiner* — Amy R Hsu
(74) *Attorney, Agent, or Firm* — Locke Lord LLP; Joshua L. Jones; Scott D. Wofsy

(57) ABSTRACT

A method of multi-sensor alignment includes mechanically moving at least one sensor in a plurality of sensors to boresight and focus the plurality of sensors with one another so a respective optical center of each of the plurality of sensors is aligned and focused. The method includes collecting calibration images of a target wherein each sensor of the plurality of sensors collects at least one image of the target, and analytically comparing the images with one another to produce a look up table (LUT) of optical distortion and spatial registration for registration of image data from the plurality of sensors. The method includes saving the LUT in sensor memory for use in registering live images from the plurality of sensors.

19 Claims, 2 Drawing Sheets

(56) References Cited

U.S. PATENT DOCUMENTS

| | | | |
|---|---|---|---|
| 5,555,324 A | 9/1996 | Waxman et al. | |
| 6,781,127 B1 | 8/2004 | Wolff et al. | |
| 8,766,808 B2 | 7/2014 | Hogasten | |
| 9,237,331 B2 | 1/2016 | Heinzle et al. | |
| 9,531,965 B2 | 12/2016 | Lablans | |
| 9,565,419 B2 | 2/2017 | Presler | |
| 10,091,439 B2 | 10/2018 | Hogasten et al. | |
| 2002/0015536 A1* | 2/2002 | Warren | H04N 5/332 382/284 |
| 2008/0062164 A1 | 3/2008 | Bassi et al. | |
| 2009/0021598 A1 | 1/2009 | McLean et al. | |
| 2009/0080706 A1* | 3/2009 | Tao | G06T 7/0004 382/110 |
| 2009/0207236 A1* | 8/2009 | Feda | H04N 13/296 348/47 |
| 2012/0249863 A1* | 10/2012 | Scussat | H04N 5/332 348/370 |
| 2014/0078492 A1 | 3/2014 | Silny et al. | |
| 2014/0300645 A1* | 10/2014 | Gillard | G06T 3/00 345/660 |
| 2015/0009335 A1 | 1/2015 | Strandemar | |
| 2015/0117716 A1* | 4/2015 | Ursin | G01V 1/3835 382/106 |
| 2015/0161801 A1 | 6/2015 | Schwartz et al. | |
| 2016/0100134 A1* | 4/2016 | Hinkel | H04N 7/181 348/159 |
| 2016/0147131 A1* | 5/2016 | Richards | H04N 5/2258 348/187 |
| 2016/0305774 A1* | 10/2016 | Ross, Jr. | G02B 27/34 |
| 2016/0381301 A1 | 12/2016 | Shroff | |
| 2017/0243373 A1 | 8/2017 | Bevensee et al. | |
| 2017/0332017 A1 | 11/2017 | Robinson et al. | |
| 2018/0081090 A1 | 3/2018 | Duparre et al. | |
| 2018/0084232 A1 | 3/2018 | Belenkii et al. | |
| 2018/0231379 A1* | 8/2018 | Pickett | G01C 11/04 |
| 2018/0303574 A1* | 10/2018 | Ramirez Luna | G03B 35/08 |
| 2019/0137339 A1* | 5/2019 | Olson | G02B 21/367 |
| 2019/0318453 A1* | 10/2019 | Jung | G06T 3/4038 |

FOREIGN PATENT DOCUMENTS

| | | |
|---|---|---|
| CN | 104272717 B | 8/2017 |
| WO | 1994020301 A1 | 9/1994 |

OTHER PUBLICATIONS

Extended European Search Report dated Mar. 20, 2020, issued during the prosecution of European Patent Application No. EP 19213415.3.

* cited by examiner

MULTI-SENSOR ALIGNMENT AND REAL TIME DISTORTION CORRECTION AND IMAGE REGISTRATION

BACKGROUND OF THE INVENTION

1. Field of the Invention

The present disclosure relates to imaging, and more particularly to multi-sensor imaging.

2. Description of Related Art

Multi-spectral imaging involves using respective sensors to image a scene, e.g., in different wavelength bands. Typically the multiple sensors will image the scene, each generating an image. The images can be combined to provide information about a scene, e.g., thermal information added in false color to a visible-spectrum image. However there are considerable difficulties in properly registering the images to each other so that relevant features in each image are aligned.

The conventional techniques have been considered satisfactory for their intended purpose. However, there is an ever present need for improved multi-sensor imaging. This disclosure provides a solution for this need.

SUMMARY OF THE INVENTION

A method of multi-sensor alignment includes mechanically moving at least one sensor in a plurality of sensors to boresight and focus the plurality of sensors with one another so a respective optical center of each of the plurality of sensors is aligned and focused. The method includes collecting calibration images of a target wherein each sensor of the plurality of sensors collects at least one image of the target, and analytically comparing the images with one another to produce a look up table (LUT) of optical distortion and spatial registration for registration of image data from the plurality of sensors. The method includes saving the LUT in sensor memory for use in registering live images from the plurality of sensors.

The plurality of sensors can include at least one sensor sensitive to short wave infrared (SWIR) wavelengths and at least one sensor sensitive to long wave infrared (LWIR) wavelengths. Mechanically moving at least one sensor can include mechanically moving the at least one sensor in three orthogonal translational directions and three orthogonal rotational directions.

The target can include a pattern formed with reflective paint and an emission pattern that are visible by each sensor in the plurality of sensors. Collecting calibration images of the target can include moving the target to different positions and/or distances in a field of view of the plurality of sensors and forming images with each sensor at each position and/or distance.

Analytically comparing can include correcting each image for distortion followed by scaling the images to a common scale. Correcting each image for distortion can include correcting at least one of barrel shape distortion and/or pin cushion distortion. The LUT can include transformations for translating, including non-linear translation, of pixels in image data from at least one of the plurality of sensors to register with image data from another one of the plurality of sensors. The method can include applying the LUT to register live multispectral images from the plurality of sensors.

A method of multi-spectral imaging includes collecting image data from a plurality of sensors that are boresighted to one another with one or more beam splitters, applying a calibrated look up table (LUT) to the image data from at least one of the plurality of sensors to register the image data from all of the plurality of sensors together, and outputting a composite image including registered image data from each sensor in the plurality of sensors. Applying a calibrated LUT can include correcting at least one of barrel shape distortion and/or pin cushion distortion.

An imaging system includes a front end optic. A plurality of sensors are optically coupled to the front end optic by at least one beam splitter. At least one of the sensors in the plurality of sensors is mounted to a mechanical jig configured to move the at least one sensor to boresight as well as focus respective optical centers of the plurality of sensors. A controller and a memory are each operatively connected to the plurality of imaging sensors to register image data from the plurality of sensors using a look up table (LUT) stored in the memory for registration of live multispectral images from the plurality of sensors. The mechanical jig can include mechanisms configured for moving at least one sensor in three orthogonal translational directions and three orthogonal rotational directions.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
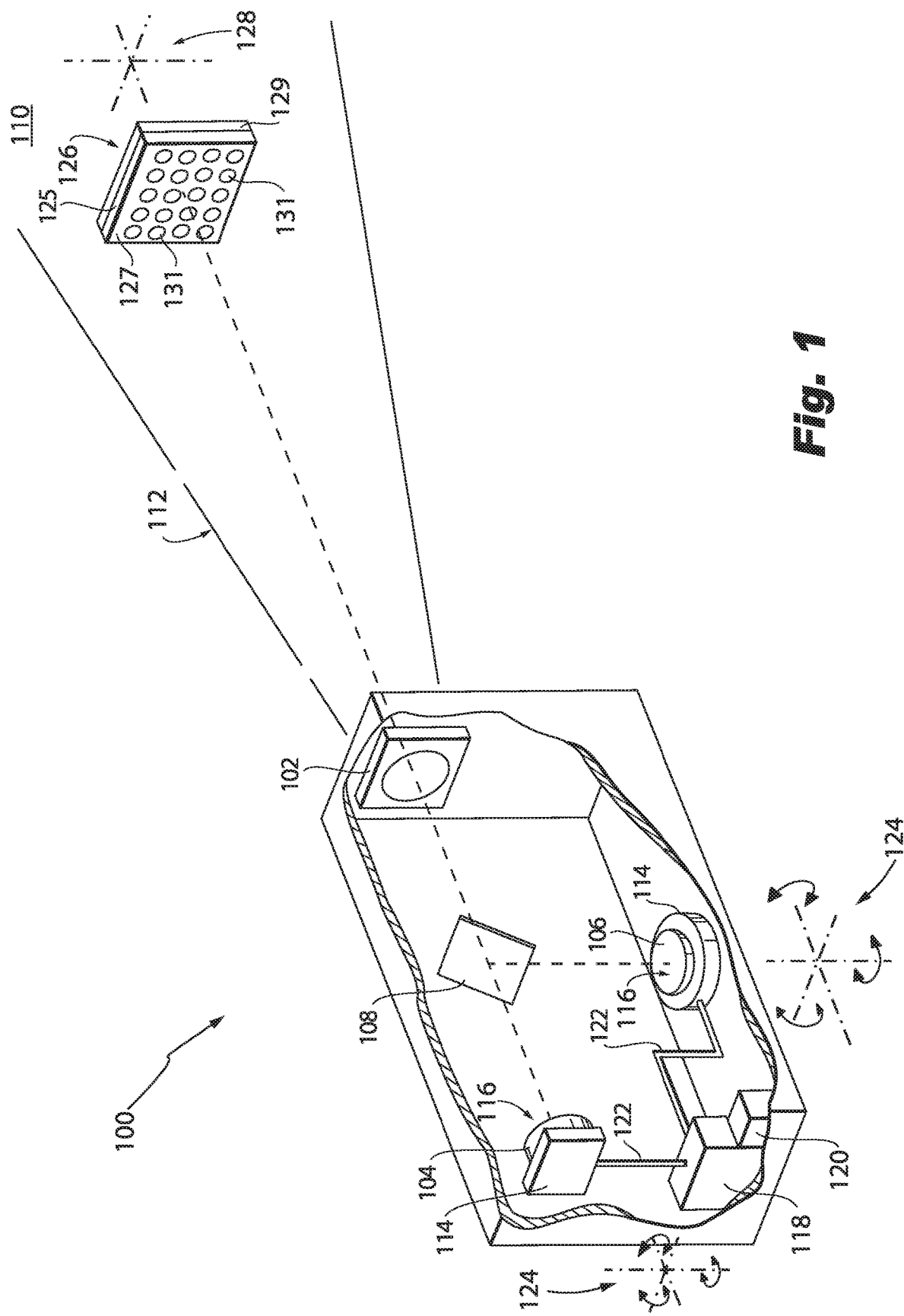
FIG. 1 is a schematic view of an exemplary embodiment of a system constructed in accordance with the present disclosure, showing a imaging system with a target in the field of view.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used for live, real time registration of multi-sensor image data, e.g., multi-spectral image data.

The imaging system 100 includes a front end optic 102, which can include a compound of lenses and/or other optical elements. A plurality of sensors 104, 106 (e.g., focal plane arrays with two-dimensional grids of pixels) are optically coupled to the front end optic 102 by at least one beam splitter 108 for forming an image of a scene 110 within a field of view 112 of the sensors 104, 106. The sensors 104, 106 thus share a common entrance aperture of the front end optic 102, which has a dual or multi-band objective lens. At least one of the sensors 104, 106 is sensitive to short wave infrared (SWIR) wavelengths, e.g., 0.6μ-1.7μ and the other is sensitive to long wave infrared (LWIR) wavelengths, e.g., 8μ-12μ. Those skilled in the art will readily appreciate that additional sensors can be included, and that any suitable wavelengths can be used without departing from the scope of this disclosure. In this context, any imaging systems having more than one imaging sensor operated independently either in the same, single spectral band or in more than one spectral band are contemplated.

Each of the sensors 104, 106 is mounted to a respective mechanical jig 114 that includes a mechanism configured to move the respective sensor 104, 106 to boresight as well as focus respective optical centers 116 of the plurality of sensors 104, 106. Each mechanical jig 114 includes a mechanism configured for moving the respective sensor 104, 106 in three orthogonal translational directions and three orthogonal rotational directions as indicated by the direction arrows 124 in FIG. 1.

A controller 118 and a memory 120 are each operatively connected, e.g. by power and/or communication lines 122, to the imaging sensors 104 to register image data from the sensors 104, 106 using a look up table (LUT) stored in the memory 120 for registration of live multispectral images from the plurality of sensors.

Figure 2:
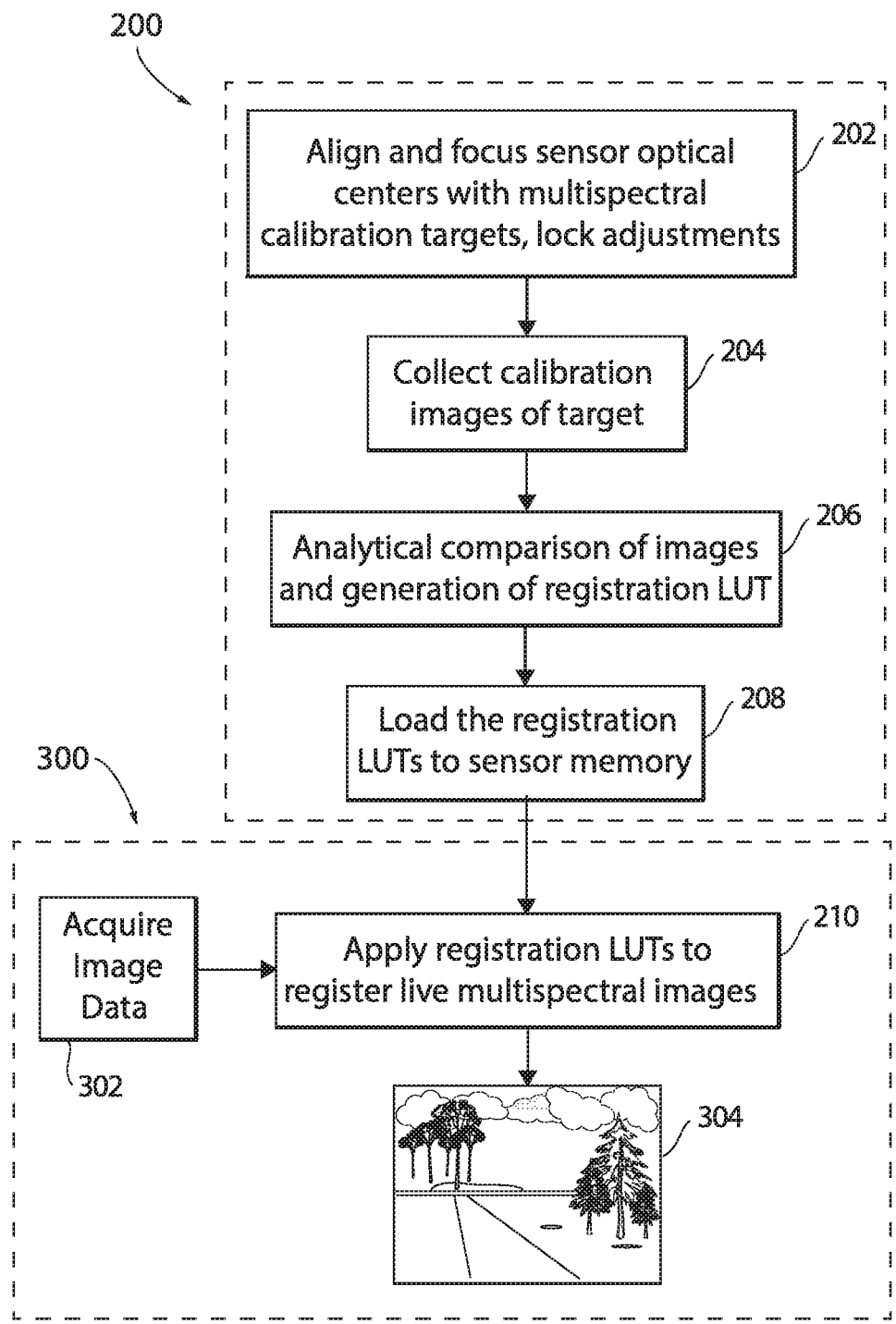
FIG. 2 is a schematic view of methods of calibrating and imaging using the system of FIG. 1.

With reference now to FIG. 2, a method 200 of multi-sensor alignment includes mechanically moving at least one of the sensors 104, 106 to boresight the sensors 104, 106 with one another so the respective optical center 116 of each of the sensors 104, 106 is aligned with the other, as indicated with box 202. Mechanically moving at least one sensor 104, 106 includes mechanically moving the sensor(s) 104, 106 in as many as three orthogonal translational directions and as many as three orthogonal rotational directions as indicated by the directional arrows 124 in FIG. 1 as needed to align the optical centers 116. Each sensor 104, 106 can be focused independently with the adjustment mechanisms of the jigs 114.

As indicated by box 204 in FIG. 2, the method 200 includes collecting calibration images of a target 126 (shown in FIG. 1) wherein each sensor 104, 106 collects at least one image of the target 126. The target 126 includes a carved pattern (e.g., the circles 131 in FIG. 1 or any other suitable pattern, which can include identical, repetitive, and regularly spaced circular patterns) on an aluminum layer 125 coated on its visible side 127 with reflective paint and a heated thermal plate 129 assembled to be back side of the aluminum layer. The reflected patterns are visible by one sensor (e.g., sensor 106) and the emission patterns are visible by another sensor (e.g., sensor 104). The patterns can be stacked together, e.g., with the reflective pattern on top of the emission pattern. High precision is used in the pattern of the target 126 in terms of pattern size, spacing, and flatness of the constructing material, and temperature control (especially if any of the sensors 104, 106 are sensitive to thermal emission). The sensors 104, 106 should be sensitive enough to the target patterns at the right signal levels, so adjustment to illumination or heating power may be required.

Each sensor 104, 106 images the target 126 simultaneously. Collecting calibration images of the target 126 includes moving the target 126 to different positions and/or distances in the field of view 112 of the sensors 104, 106 (as indicated by the directional arrows 128 in FIG. 1) and forming images with each sensor 104, 106 at each position and/or distance. It is contemplated that the target 126 can be moved from position to position so that images can be acquired with coverage of the target 126 for the entire field of view 112. It is also contemplated that in addition to or in lieu of moving the target 126, additional targets can be used. The calibration images will help in addressing distortion that differs from one sensor 104, 106 to another, e.g. as a result of different distortion from the front end optic 12 and beam splitter 108 in different wavelengths. The method 200 makes use of the imaging sensors 104, 106 as a special measuring device to locate with high precision special patterns on the target 126, uses the location information to derive spatial distortion, and to make corrections. Frame averaging can be used for noise reductions. Algorithms such as random sample consensus (RANSAC) can be used for outlier detection and removal, which helps enhancing the robustness in parameter fitting.

With continued reference to FIG. 2, the method 200 includes analytically comparing the images from sensor 104 with corresponding images from sensor 106, e.g., by means of spatially projecting and remapping, to produce a look up table (LUT), of optical distortion and spatial registration for registration of image data from the plurality of sensors, as indicated by box 206. Analytically comparing can include correcting each image for distortion followed by scaling the images to a common scale. Correcting each image for distortion can include correcting at least one of barrel shape distortion and/or pin cushion distortion. The remapping function in the LUT can be modeled with a set of affine-transform parameters derived through robust fitting. Differential coding can reduce the storage needed for the LUT in the memory 120. The calibration process can be repeated as needed over the lifetime of the system 100, e.g. by updates or regeneration of the LUT.

The method 200 includes saving the LUT in sensor memory 120 (shown in FIG. 1) for use in registering live images from the plurality of sensors. The LUT combines the operations of image projecting and remapping of pixels in image data from one of the sensors 104, 106 to the other, e.g., for channel-to-channel image registration. Where more than two channels are included in the system 100, one channel can be a master to which all the remaining channels are mapped. The method 200 can optionally include applying the LUT to register live multispectral images from the plurality of sensors as represented by box 210.

A method 300 of multi-spectral imaging includes collecting image data from a plurality of sensors 104, 106 that are boresighted as described above as indicated by box 302. The method 300 also includes applying a calibrated look up table (LUT) as described above to the image data from at least one of the sensors 104, 106 to register the image data from all of the sensors 104, 006 together, as indicated by box 210. This registration can be done during live imaging. The method 300 also includes outputting a composite image including registered image data from each sensor in the plurality of sensors as indicated in box 304. Those skilled in the art will readily appreciate that aside from composite images, any other suitable type of image output can be used. Applying the calibrated LUT can include correcting at least one of barrel shape distortion and/or pin cushion distortion.

For imaging systems involving multiple sensors, the ability to accurately co-register images obtained by all sensors as disclosed herein improves quality and effectiveness of imaging systems in applications such as surveillance, targeting, or general-purpose spatial mapping. This can provide for seamless integration of sub-systems such as electro-optical, mechanical and software. It can also improve accuracy, timing, and size weight and power (SWAP) factors relative to traditional systems.

The methods and systems of the present disclosure, as described above and shown in the drawings, provide for multi-sensor imaging with superior properties including calibrated, live registration of image data, e.g. multi-spectral image data. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of multi-sensor alignment comprising:
   mechanically moving at least one sensor in a plurality of sensors to boresight and focus the plurality of sensors with one another so a respective optical center of each of the plurality of sensors is aligned and focused, wherein the plurality of sensors share a single entrance aperture;
   collecting calibration images of a target wherein each sensor of the plurality of sensors collects at least one image of the target;
   analytically comparing the images with one another to produce a look up table (LUT) of optical distortion and spatial registration for registration of image data from the plurality of sensors; and
   saving the LUT in sensor memory for use in registering live images from the plurality of sensors.

2. The method as recited in claim 1, wherein the plurality of sensors includes at least one sensor sensitive to short wave infrared (SWIR) wavelengths and at least one sensor sensitive to long wave infrared (LWIR) wavelengths.

3. The method as recited in claim 1, wherein mechanically moving at least one sensor includes mechanically moving the at least one sensor in three orthogonal translational directions and three orthogonal rotational directions.

4. The method as recited in claim 1, wherein the target includes a pattern formed with reflective paint and an emission pattern that are visible by the plurality of sensors.

5. The method as recited in claim 4, wherein collecting calibration images of the target includes moving the target to different positions and/or distances in a field of view of the plurality of sensors and forming images with each sensor at each position and/or distance.

6. The method as recited in claim 1, wherein analytically comparing includes correcting each image for distortion followed by scaling the images to a common scale.

7. The method as recited in claim 6, wherein correcting each image for distortion includes correcting at least one of barrel shape distortion and/or pin cushion distortion.

8. The method as recited in claim 1, wherein the LUT includes transformations for translating, including non-linear translation, of pixels in image data from at least one of the plurality of sensors to register with image data from another one of the plurality of sensors.

9. The method as recited in claim 1, further comprising applying the LUT to register live multispectral images from the plurality of sensors.

10. A method of multi-spectral imaging comprising:
    collecting image data from a plurality of sensors that are boresighted to one another with one or more beam splitters, wherein the plurality of sensors share a single entrance aperture;
    applying a calibrated look up table (LUT) to the image data from at least one of the plurality of sensors to register the image data from all of the plurality of sensors together; and
    outputting a composite image including registered image data from each sensor in the plurality of sensors.

11. The method as recited in claim 10, wherein the plurality of sensors includes at least one sensor sensitive to short wave infrared (SWIR) wavelengths and at least one sensor sensitive to long wave infrared (LWIR) wavelengths.

12. The method as recited in claim 10, wherein applying a calibrated LUT includes correcting at least one of barrel shape distortion and/or pin cushion distortion.

13. The method as recited in claim 10, wherein the LUT includes transformations for translating, including non-linear translation, of pixels in image data from at least one of the plurality of sensors to register with image data from another one of the plurality of sensors.

14. The method as recited in claim 10, wherein applying the calibrated LUT includes registering live multispectral images from the plurality of sensors.

15. An imaging system comprising:
    a front end optic;
    a plurality of sensors optically coupled to the front end optic by at least one beam splitter, wherein at least one of the sensors in the plurality of sensors is mounted to a mechanical jig configured to move the at least one sensor to boresight as well as focus respective optical centers of the plurality of sensors, wherein the plurality of sensors share a single entrance aperture; and
    a controller and a memory each operatively connected to the plurality of imaging sensors to register image data from the plurality of sensors using a look up table (LUT) stored in the memory for registration of live multispectral images from the plurality of sensors.

16. The system as recited in claim 15, wherein the plurality of sensors includes at least one sensor sensitive to short wave infrared (SWIR) wavelengths and at least one sensor sensitive to long wave infrared (LWIR) wavelengths.

17. The system as recited in claim 15, wherein the mechanical jig includes mechanisms configured for moving at least one sensor in three orthogonal translational directions and three orthogonal rotational directions.

18. The system as recited in claim 15, wherein the LUT includes transformations for correcting image data for distortion including correcting at least one of barrel shape distortion and/or pin cushion distortion.

19. The system as recited in claim 15, wherein the LUT includes transformations for translating, including non-linear translation, of pixels in image data from at least one of the plurality of sensors to register with image data from another one of the plurality of sensors.

* * * * *